Oct. 13, 1942.  H. SIEWING, JR  2,298,631
APPARATUS FOR WAXING VEGETABLES
Filed March 13, 1941  2 Sheets-Sheet 1
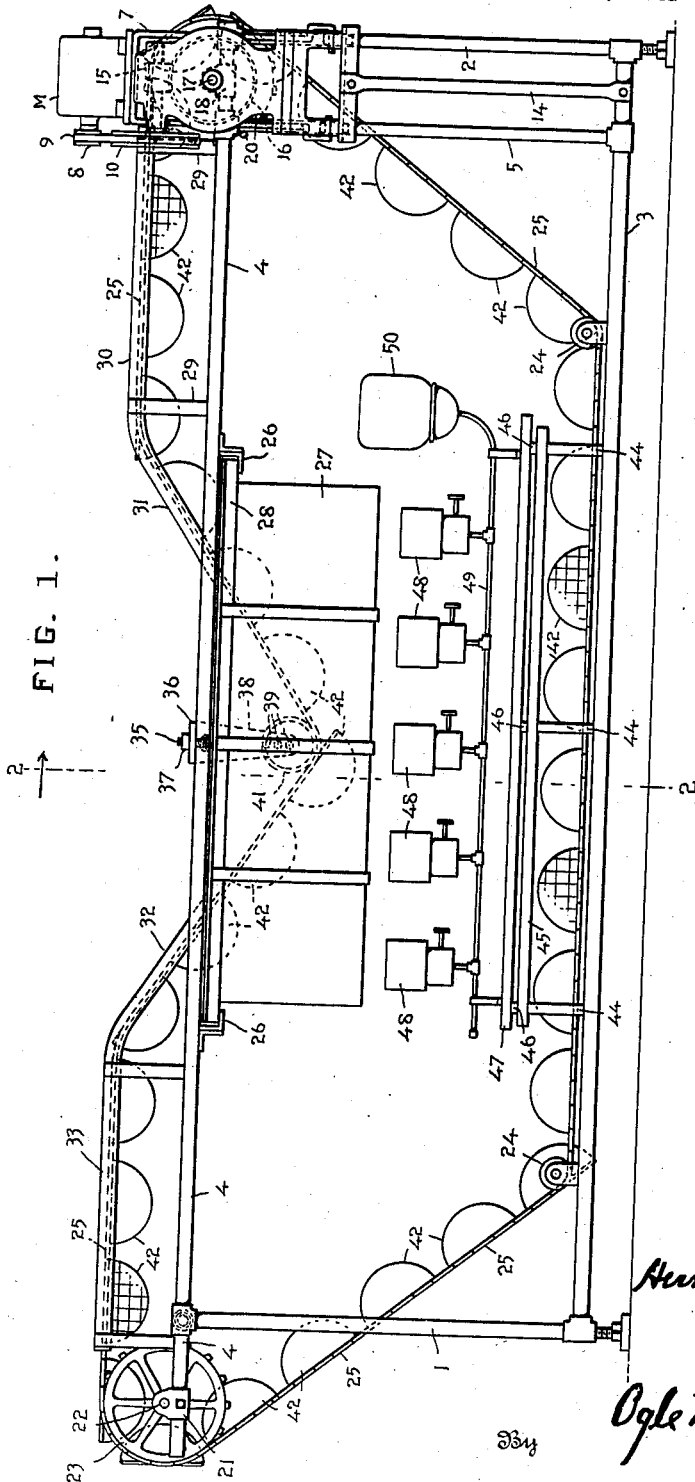
Herman Siewing, Jr.
Inventor
By Ogle R. Singleton
Attorney

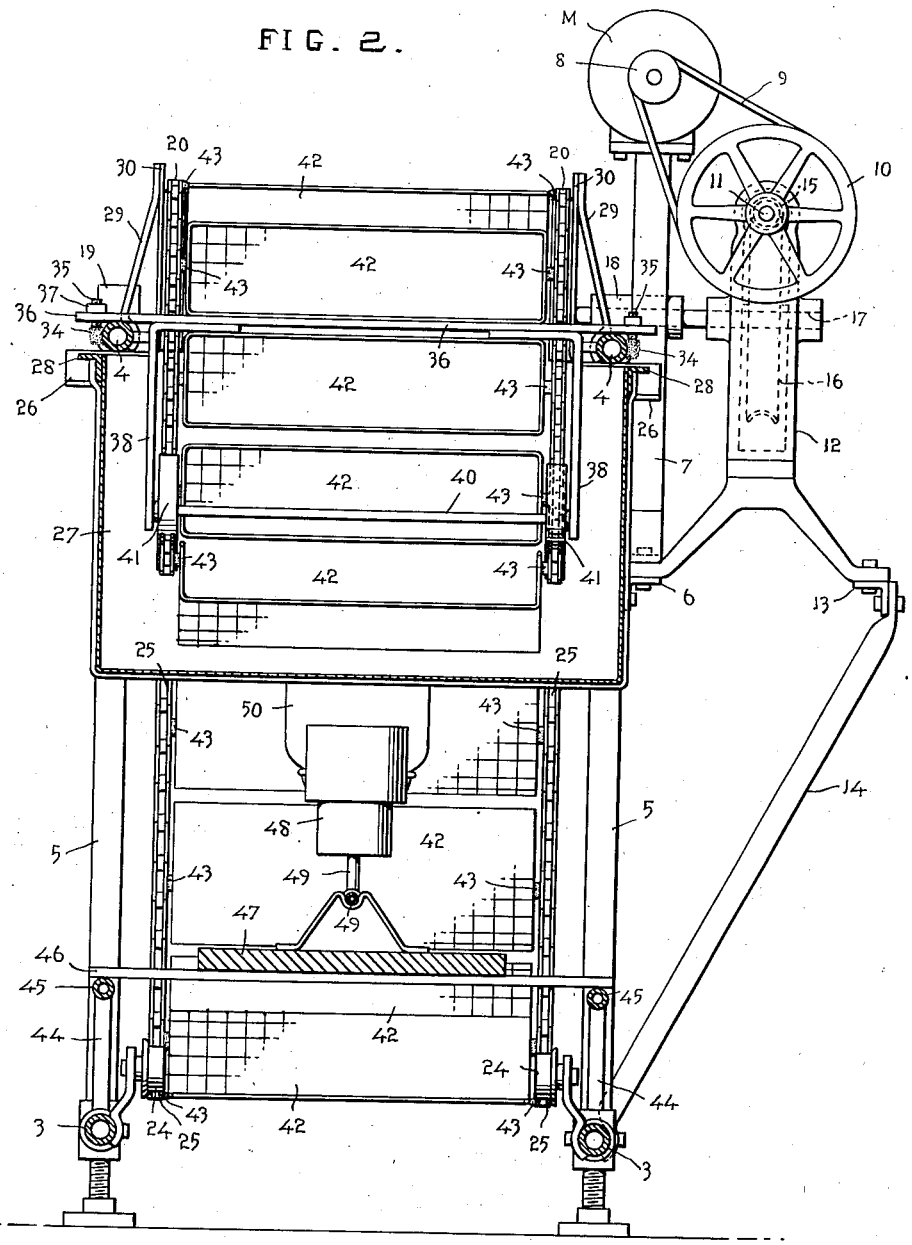

Patented Oct. 13, 1942

2,298,631

UNITED STATES PATENT OFFICE 2,298,631

APPARATUS FOR WAXING VEGETABLES

Herman Siewing, Jr., Glasgow, Mont.

Application March 13, 1941, Serial No. 383,231

6 Claims. (Cl. 91—46)

My invention consists in a new and useful improvement in apparatus for waxing vegetables, and is designed to provide a machine for applying a thin coating of wax to vegetables to protect them against drying and shrivelling when packed and shipped. The particularly novel and useful features of my improved apparatus are the means which I provide for mounting the tank for the fluid wax for coating and the conveying means whereby the vegetables are passed through the wax to receive the desired coating.

In the drawings:

Fig. 1 is a side elevation of my improved apparatus.

Fig. 2 is an enlarged transverse vertical section on the line 2—2 of Fig. 1.

As illustrated in the drawings, my improved apparatus is mounted in a frame composed of suitable piping, comprising the two end posts 1, at one end of the frame, the two end posts 2, at the other end of the frame, the lower side rods 3, and the upper side rods 4. Suitably spaced from the posts 2 and connecting the side rods 3 and 4 are the posts 5. The posts 2 and 5, on one side of the frame, have fixed thereon an L-beam 6 suitably spaced below the upper side rod 4. Carried by this beam 6 is the bracket 7 on which is mounted the motor M having its pulley 8 connected by band 9 with pulley 10 on shaft 11 suitably journaled in housing 12 mounted on beam 6 and beam 13 supported by strut 14 from lower side rod 3. The shaft 11 has thereon the worm 15 meshing with the worm gear 16 on shaft 17 suitably journaled in housing 12 and journals 18 and 19 on the upper side rods 4, and having mounted thereon the two sprocket wheels 20 positioned between the side rods 4. The rods 4, at the end of the frame opposite the end on which the motor M is mounted, extend beyond the posts 1 and are each provided with a collar 21 adjustably mounted thereon, for longitudinal movement therealong. In these collars 21 is journaled a shaft 22 on which is mounted a pair of sprocket wheels 23 aligned with the two sprocket wheels 20 respectively. Suitably positioned adjacent the rods 1 and 5, on the lower side rods 3 are the idler rollers 24. Two endless sprocket chains 25 are mounted on the sprocket wheels 20 and 23 and the rollers 24. Suitably suspended from the side rods 4 are the transverse L-beams 26 on which is slidably mounted the tank 27 by means of longitudinal L-beams 28 fixed to the upper edges of the sides of the tank 27. Suitably mounted on the rods 4 by brackets 29 are the horizontal tracks 30 supporting the chains 25 as they pass over and off of the tops of the wheels 20. Extending from these tracks 30 are the inclined tracks 31 passing downwardly to the level of the rods 4, at points above one end of the open top of the tank 27. Tracks 32, similar to tracks 31, are mounted on the rods 4 over the other end of the tank 27 and connect with tracks 33, similar to tracks 30, supporting the chains 25 as they pass to the tops of and over sprocket wheels 23. The rods 4 are provided with lugs 34, at points above the middle of tank 27, each having an upstanding bolt 35 projecting above the rod 4. I provide a transverse beam 36 carried on the rods 4 and attached to bolts 35 by nuts 37. Depending from the beam 36 are the brackets 38, each having a series of journals 39. Mounted in corresponding journals 39 is the shaft 40 carrying the idler rollers 41 about which pass the sprocket chains 25 respectively. Carried between the two sprocket chains 25 are the containers 42. As illustrated in the drawings, these containers 42 are wire baskets. It is obvious that they may be of any character adapted to expose the contents thereof to the bath contained in the tank 27. Each container 42 has each of its ends attached to one of the links of the chains 25, as by welds 43, so that the containers 42 are not only caused to move through the apparatus by the travel of the chains 25, but also to be positioned according to the positions assumed by the links to which they are attached. Suitably mounted by posts 44 on the lower side rods 3 are the sills 45 carrying transverse beams 46 on which rests base 47 on which is mounted a series of burners 48 by means of a common oil supply pipe 49 supplied by an oil reservoir 50.

From the foregoing description of the details of construction of my improved apparatus, its operation and use will be obvious. A sufficient quantity of any suitable kind of wax, paraffin, etc., is placed in the tank 27 and heat is applied thereto by means of the burners 48. The baskets 42 are then charged with the vegetables to be coated, the loading being conveniently done while the baskets 42 are supported in upright position on tracks 30 or on tracks 33. Power is then supplied by motor M to the sprocket wheels 20 and thereby the chains 25 are caused to travel carrying the baskets 42 therewith. The movement of the baskets 42, depending on whether the baskets 42 are loaded while on tracks 30, or on tracks 33, is such that the loaded baskets 42 pass downwardly on tracks 31, or on tracks 32, into the tank 27, and thence upwardly and out of the tank 27. The passage of the baskets 42 through tank 27, as the chains 25 carrying baskets 42 pass about the idler rollers 41, subjects the vegetables in the baskets 42 to a bath of the melted wax or other coating medium in the tank 27. As the baskets 42 containing the wax coated vegetables pass over the wheels 20 or the wheels 23, the movement of chains 25 about said wheels causes the baskets 42 to be so tilted as to empty the coated vegetables therefrom and they pass to any suitable receiving means disposed adjacent the discharge end of my apparatus.

From the foregoing, it is obvious that either end of my apparatus may serve as the charging end, the waxed vegetables being discharged at the other end, the direction of travel of the chains 25 and their attached baskets 42 being determined according to which end is used for charging the baskets 42.

It is to be noted that the depth of immersion of the baskets 42 in the bath contained in the tank 27 may be determined by the disposition of the axle 40 of the rollers 41 in the several sets of journals 39 in the brackets 38. This adjustment of the rollers 41 to different depths within the tank 27 is made possible by the fact that sprocket wheels 23 are mounted on the rods 4 by means of the collars 21 which are endwise adjustable on the rods 4.

It is to be particularly noted that the rollers 41 are removable from within the tank 27, since when the nuts 37 are removed from the bolts 35 the beam 36 can be removed from bolts 35, thereby raising the rollers 41 from the tank 27. By rotating the wheels 23, by hand, the run of the chains 25 with baskets 42 may be raised from the tank 27 and tracks 31 and 32, so that the chains 25 extend horizontally across the entire top of my apparatus. The tank 27 may then be removed from the apparatus by sliding it sidewise, the ends of the beams 28 riding on the beams 26. The burners 48 may also be removed from the apparatus by sliding the base 47 sidewise on the beams 46.

While I have illustrated in the drawings filed herewith and have hereinbefore fully described one specific embodiment of my invention, it is to be distinctly understood that I do not consider my invention limited to said specific embodiment, but refer for its scope to the claims appended hereto.

Having described my invention, what I claim is:

1. In an apparatus for immersing objects, the combination of a frame; a tank mounted in said frame; an endless conveyor mounted in said frame; a plurality of containers mounted in said conveyor; a second frame removably mounted in said first frame and depending into said tank; and a pair of rollers adjustably mounted in said second frame within said tank, said conveyor passing about said rollers, so that the depth of immersion of the containers on the conveyor is determined by the adjustment of the rollers in said second frame.

2. In an apparatus for immersing objects, the combination of a frame having a pair of parallel sills; a pair of transverse L-beams depending from said sills; a tank having a longitudinal L-beam mounted on the upper edge of each side, the ends of said longitudinal L-beams extending beyond the ends of the tank and being slidably received on the said transverse L-beams; an endless conveyor mounted in said frame; a plurality of containers mounted in said conveyor; and a pair of rollers mounted on said frame, over which said conveyor moves, adapted to cause said conveyor and its containers to move into and out of said tank.

3. In an apparatus for immersing objects, the combination of a frame having a pair of parallel sills; a pair of transverse L-beams depending from said sills; a tank having a longitudinal L-beam, mounted on the upper edge of each side, the ends of said longitudinal L-beams extending beyond the ends of the tank and being slidably received on the said transverse L-beams; an endless conveyor mounted in said frame; a plurality of containers mounted in said conveyor; a pair of brackets mounted on said frame and depending into said tank; and a roller adjustably mounted on each bracket within said tank, said conveyor passing about said rollers, so that the depth of immersion of the containers on the conveyor is determined by the adjustment of the rollers on their brackets.

4. In an apparatus for immersing objects, the combination of a frame; a trackway in said frame; a tank slidably mounted on said trackway; an endless conveyor so mounted in said frame as to travel along said trackway; a plurality of containers mounted in said conveyor; and a pair of rollers mounted on said frame and disposed within said tank, over which said conveyor moves, so as to cause said conveyor and its containers to move into and out of said tank when said conveyor is caused to travel.

5. In an apparatus for immersing objects, the combination of a frame; a tank removably mounted in said frame; an endless conveyor mounted in said frame and provided with containers; a pair of rollers over which said conveyor and its containers move into and out of said tank; and supporting means disposing said rollers in said tank, and being adapted to be removably mounted on said frame.

6. In an apparatus for immersing objects, the combination of a frame; a tank removably mounted in said frame; an endless conveyor mounted in said frame and provided with containers; a pair of rollers over which said conveyor and its containers move into and out of said tank when said conveyor is caused to travel; and supporting means disposing said rollers in said tank and being adapted to be removably mounted on said frame, said rollers being adjustably mounted in said supporting means so that the depth of immersion of the containers on the conveyor is determined by the adjustment of the rollers in said supporting means.

HERMAN SIEWING, Jr.